United States Patent
Matsuzaki et al.

[19]

[11] Patent Number: 5,867,218
[45] Date of Patent: Feb. 2, 1999

[54] IMAGING APPARATUS HAVING BOX-LIKE AND CARD-LIKE PARTS

[75] Inventors: Miki Matsuzaki; Shinichi Harada; Akiteru Kimura; Hiroo Hosono, all of Tokyo, Japan

[73] Assignee: Olympus Optical Co., Ltd., Tokyo, Japan

[21] Appl. No.: 492,999

[22] Filed: Jun. 21, 1995

[30] Foreign Application Priority Data

Jun. 22, 1994 [JP] Japan .................................. 6-140517

[51] Int. Cl.⁶ ............................ H04N 5/225; H04N 7/00; H04N 11/00
[52] U.S. Cl. .......................... 348/373; 348/552; 348/207
[58] Field of Search .................... 348/552, 207, 348/222, 231, 373

[56] References Cited

U.S. PATENT DOCUMENTS

| | | | |
|---|---|---|---|
| 5,221,964 | 6/1993 | Chamberlain et al. | 348/373 |
| 5,231,501 | 7/1993 | Sakai | 358/209 |
| 5,438,359 | 8/1995 | Aoki | 348/207 |
| 5,475,441 | 12/1995 | Parulski et al. | 348/552 |

FOREIGN PATENT DOCUMENTS

| | | | |
|---|---|---|---|
| 2289555 | 11/1995 | United Kingdom | G06F 3/00 |
| WO 93/14458 | 7/1993 | WIPO | G06F 15/02 |
| WO93/14458 | 7/1993 | WIPO | H04N 1/00 |

*Primary Examiner*—Wendy Garber
*Assistant Examiner*—Alicia M. Harrington
*Attorney, Agent, or Firm*—Pillsbury Madison & Sutro LLP

[57] ABSTRACT

An imaging apparatus are provided with a card-like part 1*a*, a box-like part 1*b* united thereto, a connector 14 provided at one end of the card-like part 1*a* and having a terminal for sending out signal to the outside, a camera unit 11 detachably accommodated in the box-like unit 1*b*, an imaging circuit unit 15 for digitalizing image output from the camera unit 11, signal processing means including a digital processing circuit unit 16 for digitally processing the output signal of the unit 15 and a memory circuit unit 17 capable of storing the processed digital signal, an operating unit 12 provided in the box-like part 1*b* and operable in connection with imaging, and trigger switches 12*b* and 11*c* provided for imaging on the operating unit 12 and camera unit 11, respectively.

6 Claims, 8 Drawing Sheets

IMAGING APPARATUS HAVING BOX-LIKE AND CARD-LIKE PARTS

BACKGROUND OF THE INVENTION

The present invention relates to an imaging apparatus and, more particularly, to an imaging apparatus for digitally processing an image signal obtained by an imaging unit.

Recently, reduction in size of digital information units and apparatus has caused a trend for wide-spread use of portable digital information unit/terminals, such as note-type personal computers, PDA (Personal Digital Assistant) personal information terminals, electronic notes, etc. There is also proposed a system, in which an image is picked up with such a portable information unit/terminal, processed and edited or subjected to DTP (desk top publishing) in a visited place for transmitting the image data thus obtained to digital apparatuses or the like in offices though an existing communication network such as telephone lines.

In a usual process of picking up the foreground image into such a portable information unit/terminal, the image signal obtained with a video movie or the like is input as an image signal by using a video input board or the like. According to this process, the image can be acquired comparatively speedily, while it is impossible to obtain image quality higher than that of the video signal. However, the portable information unit/terminal used in visited places usually have no function expansion slot for mounting a function expansion board or the like due to requirements of portability. Therefore, it is difficult to utilize function expansion boards such as video boards.

As other means for realizing the same purpose, a digital still camera has been proposed, which is used with IC cards as recording medium. This digital still camera is capable of easily acquiring the image data at the visited place due to the compact and light weight of the body and the memory medium. With such digital still camera, in order to process or edit the image signal recorded in the IC card, it is necessary to transfer the IC card to the portable information unit/terminal and to read out the data therefrom.

In another process of transmitting the image data, the digital still camera is provided with a data communication interface and connected via cable or the like to the portable information unit/terminal. In this case, however, the data communication speed of the general-purpose interface I/F, such as "RS232C" or "SCSI", which is generally equipped, is slow, and considerable time is required for transmitting one frame of data for the large capacity of the image data.

With the above still camera, at least both the digital still camera and the portable information unit/terminal are necessary in either of the above processes, causing inconvenience of handling in the visited place.

To obviate such inconvenience, an electronic camera having a card-like form like an IC memory card, has been proposed, as disclosed in Japanese Patent Laid-open Publication No. 176168/1989. FIGS. 10 and 11 show the disclosed electronic camera. As shown, the camera has a card-like camera body 51 made of a plastic material. An image pick-up lens 52 is provided substantially at the center of the camera body 51. A CCD image sensor 53 is assembled at a position on the optical axis of and in the focal plane of the image pick-up lens 52. An eyepiece lens 54 is disposed above the image pick-up lens 52 in FIG. 10. A white balance sensor light collection window 55 is provided on the side of the image pick-up lens 52 opposite the eyepiece lens 54. Along the left edge of the camera body 51 in FIG. 10, a plurality of switches 56 including a shutter switch and other mode switches for shutter speed control and date copying are provided such that they are operable from the outside. A connector 57 having a plurality of contacts is provided along the edge opposite the switches 56.

When reproducing the image data recorded by such electronic camera, the circuit thereof is connected to the circuit of a reproducing apparatus (not shown) by inserting the connector 57 thereinto. Such a card-like electronic camera can be used as the recording medium with a portable information unit/terminal. In addition, the data communication speed of the interface provided in the card is so high that the camera is suited for transmitting the video data therefrom to other digital units.

However, the electronic camera proposed in the above Japanese Patent Laid-open Publication No. 176168/1989 pays no attention to a shape thereof for imaging in combination with the portable information unit/terminal. Actually, the disclosed card-like electronic camera has an eyepiece 54 and is adopted for imaging only by itself. When imaging is made with such electronic camera alone, the picked-up picture can not be confirmed on an electronic display or like display means. It is thus difficult to recognize the output image of the picked-up image. Further, according to the sole electronic camera it is impossible to record comments at the time of imaging. Thus, it is necessary to connect the portable information unit/terminal for recording the desired data or comments.

Further, according to the publication as noted above, the eyepiece lens 54 and image pick-up lens 52 are mounted such that their optical axes extend in the thickness direction of the camera body. Therefore, the camera body is required to have a considerable thickness. Actually, it is difficult to provide an electronic camera having approximately the same thickness as that of an IC memory card. Moreover, the eyepiece lens has to occupy a certain area, thus inevitably leading to a size increase of the card part of the camera.

SUMMARY OF THE INVENTION

An object of the present invention is therefore to provide a handy imaging apparatus, capable of imaging only by itself and also capable of imaging with an information unit/terminal or the like connected thereto.

According to one aspect of the present invention, there is provided an imaging apparatus having: a housing including, as united parts, a card-like part and a box-like part; a terminal provided in the card-like part for sending out signals to the outside; an imaging unit accommodated in the box-like part; and signal processing means accommodated in either locality of the housing and including a signal processing unit for digitally processing an output signal from the imaging unit and a memory unit for storing the processed digital signal.

According to another aspect of the present invention, there is provided an imaging apparatus having: a card-like part capable of being inserted into a different unit; and a box-like part which is provided at one end of the card-like part and is adapted to project from the different unit when the card-like part is inserted in the different unit.

According to other aspect of the present invention, there is provided an imaging apparatus having: a card-like part; a box-like part united to the card-like part; a connector provided at one end of the card-like part and having a terminal for sending out signals to the outside; a camera unit detachably accommodated in the box-like unit; an imaging circuit unit for digitalizing image output from the camera unit; signal processing means for digitally processing the output signal of the camera unit; a memory circuit unit for storing the processed digital signal; an operating unit provided in the box-like part and operable in connection with imaging; and first and second trigger switches for imaging provided on the operating unit and camera unit, respectively.

Other objects and features will be clear from the following description with reference to attached drawings.

DETAILED DESCRIPTION OF THE PREFERRED EMBODIMENTS

Figure 1:
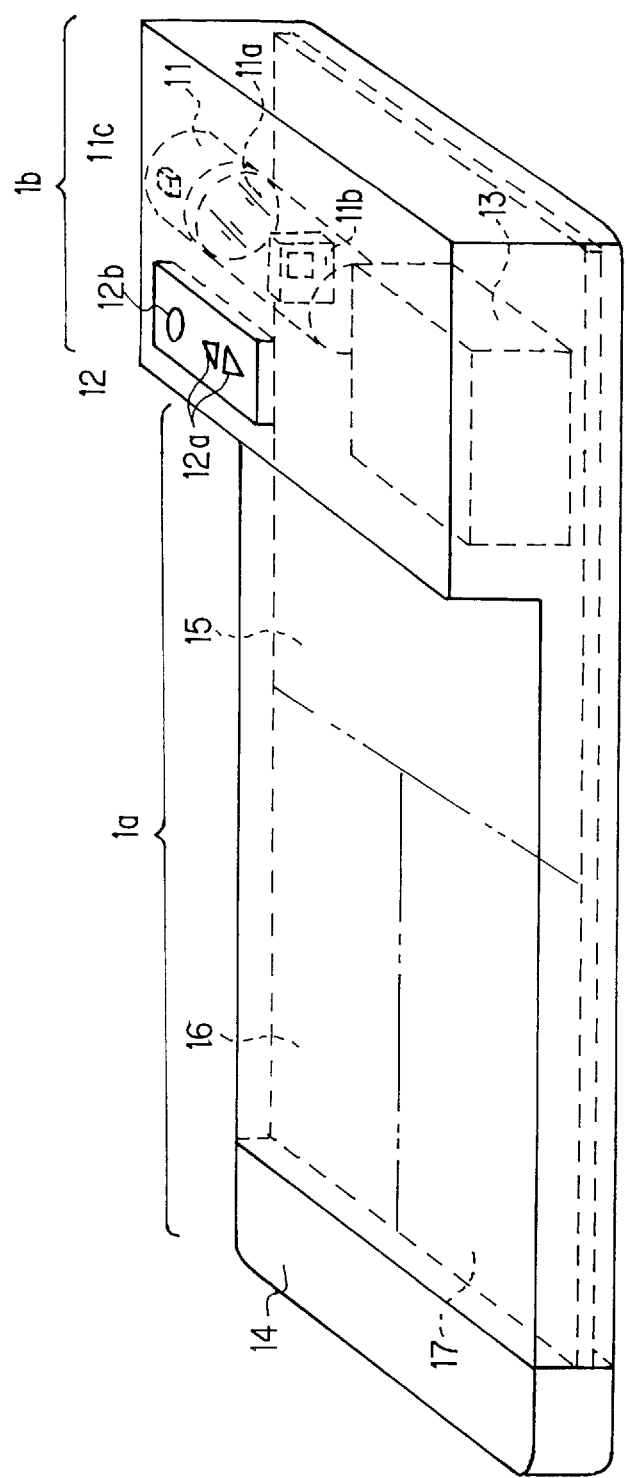
FIG. 1 is a perspective view showing an imaging apparatus according to the present invention.

FIGS. 1 to 9 illustrate embodiments of the present invention. FIG. 1 is a perspective view showing an imaging apparatus. This imaging apparatus 1 comprises a card-like part 1a which can be inserted into a different unit or apparatus (not shown) and a box-like part 1b which is provided at one end of the card-like part 1a. The box-like part 1b is adapted to project from the different unit or apparatus when the card-like part 1a is inserted in the different unit or apparatus such that it does not interfere with the different unit or apparatus.

The box-like part 1b comprises a camera unit 11 as an image sensor unit including a lens 11a, an imager 11b disposed on the focal plane of the lens 11a, and a trigger switch 11c as trigger means used when picking up the picture. It further comprises a power supply unit 13 for supplying a power to various circuit parts, and an operating unit 12 including input switch/knobs 12a as, for instance, image sensor output gain control means, recording mode switching means, shutter speed switching means, etc. and a trigger switch 12b as trigger means when picking up the picture. The power supply unit 13 includes a battery and a voltage regulator for generating various predetermined voltage levels. In case of the camera having an electric flash, the battery of the power supply unit 13 supplies the power to the electric flash so as to overcome the difficulty of providing a large current power supply for charging a main capacitor in the electric flash.

The card-like part 1a, is provided with an imaging circuit unit 15 for driving the imager 11b and A/D converting the image output therefrom, a digital processing circuit unit 16 for processing the digital signal, and a memory circuit unit 17 including a semiconductor memory for storing the digital image data. The card-like part 1a has its end provided with a connector 14 including a terminal for sending out the signal to the outside.

Figure 2:
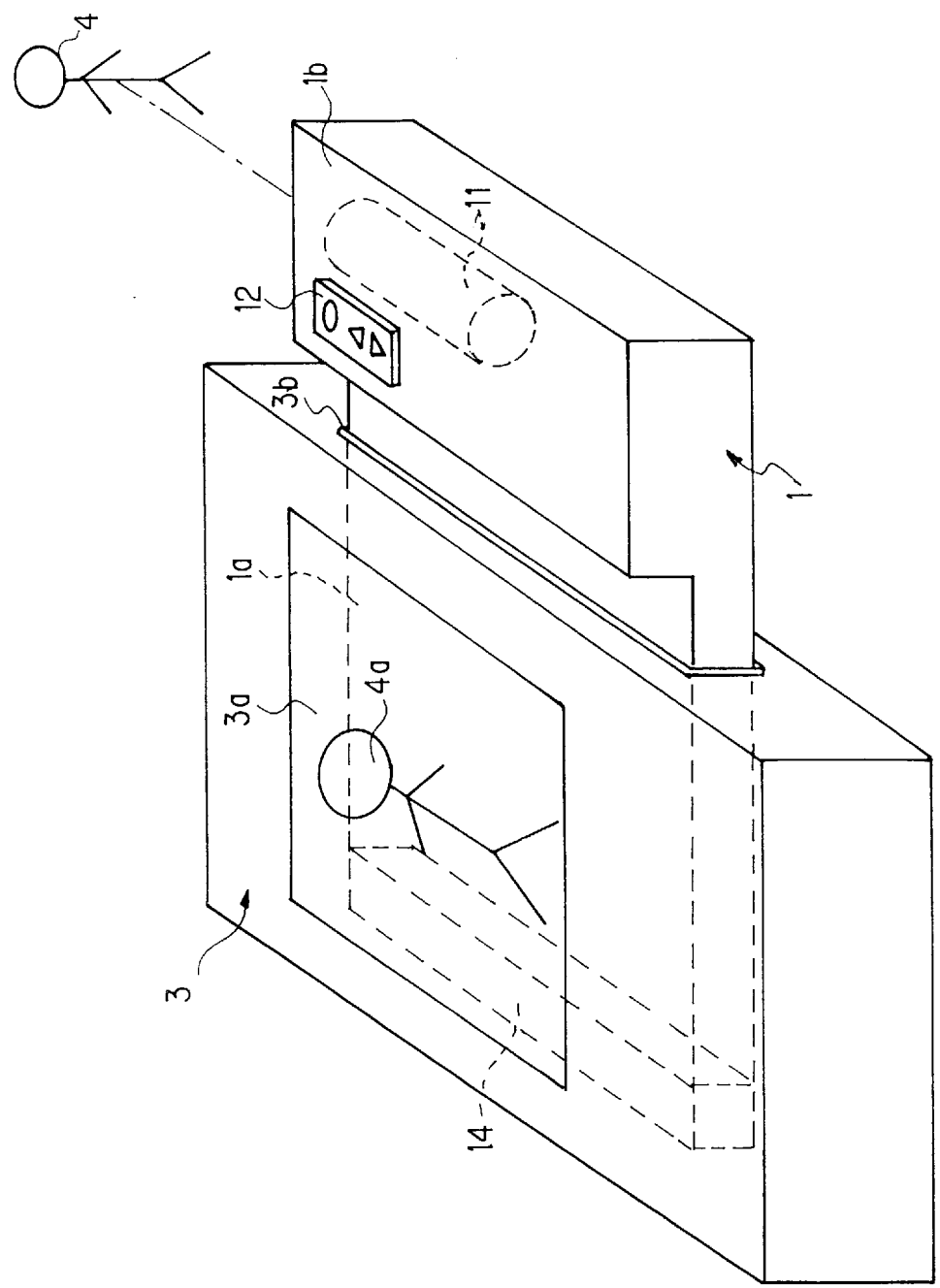
FIG. 2 is a perspective view of the imaging apparatus 1 in FIG. 1 capable of being assembled with a portable information unit/terminal according to the present invention.

The above image pick-out apparatus 1 can be assembled with a portable information unit/terminal in a state as shown in the perspective view of FIG. 2. As shown, the card-like part 1a of the imaging apparatus 1 is inserted into a card slot 3b of the information unit/terminal 3, and is electrically connected thereto via the card connector 14. A display means 3a such as an LCD is provided on the top of the information unit/terminal 3. A signal from the camera unit 11 in the box-like part 1b, is supplied to the display means 3a, for displaying the picked-up image 4a. In the illustrated state capable of imaging, the box-like part 1b projects from the information unit/terminal 3. That is, the input means such as switches and knobs assembled in the operating unit 12 are operable from the outside.

Figure 3:
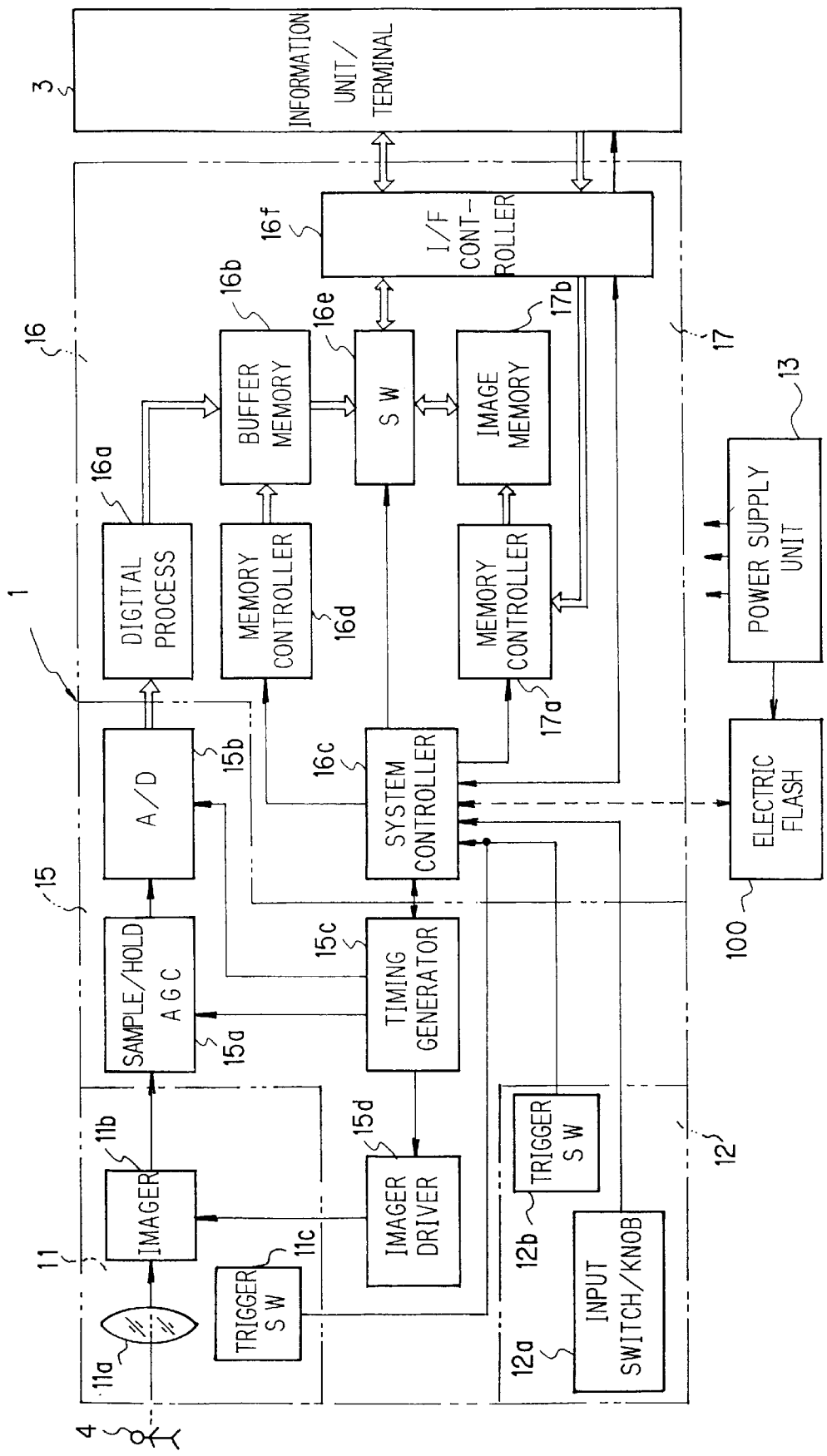
FIG. 3 is a circuit of the imaging apparatus 1 according to the present invention.

A circuit of the imaging apparatus 1 is shown in FIG. 3. The main circuit of the imaging apparatus 1 comprises the above camera unit 11 for taking in (imaging) the image of the object 4 and converting it into an electric signal, an imaging circuit unit 15 for A/D converting the image output from the camera unit 11, a digital processing circuit unit 16 for processing the digital signal from the imaging circuit unit 15, a memory circuit unit 17 for storing the digital image data received from the digital processing circuit unit 16, an operating unit 12 for inputting instruction signals to the digital processing circuit unit 16, and the power supply unit 13. The battery of the power supply unit 13 supplies the power to the electric flash for charging a main capacitor in the electric flash as described before.

The light image of the object is focused on the imager 11b through the lens 11a. The imager 11b is driven by an imager driver 15d to be described later. The output signal of the imager 11b is input to a sample/hold AGC circuit 15a in the imaging circuit unit 15 for initializing processes such as noise reduction before being supplied to an A/D converter 15b. At this time, the imager driver 15d provides a drive pulse signal for driving the imager 11b based on a timing signal generated from a timing generator 15c in the imaging circuit unit 15. In addition, the sample/hold AGC circuit 15a, the AD converter 15b and other circuits are synchronized to one another based on the timing signal.

The digitized image signal obtained by the A/D converter 15b is input to the digital processing circuit unit 16 wherein the input image signal is subjected in a digital processing circuit 16a to such processes as Y/C separation, matrixing and white balancing. The resultant signal is stored as, for instance, one frame of image data in a buffer memory 16b under control of a memory controller 16d. The memory controller 16d is controlled by a system controller 16c for controlling various circuits of the imaging apparatus 1. The system controller 16c further controls the timing generator 15c. The image data stored in the buffer memory 16b is supplied to an interface controller 16f, through a switch controlled by the system controller 16c.

The interface controller 16f converts the input image data to a signal form capable of being transmitted to the information unit/terminal 4 under control of the system controller 16c and transmits a control signal to a system controller (not shown) on the side of the information unit/terminal 3 and the converted image data via the data bus of the connector 14 to the information unit/terminal 3. Thus, in the information unit/terminal 3, the picked-up image 4a is displayed on the display means 3a, as shown in FIG. 2.

When it is desired to record the image data displayed as the picked-up image 4a, either of the trigger switches 11c and 12b provided in the camera unit 11 and operating unit 12, respectively, is operated. In response to this operation, the system controller 16c switches the switch 16e to supply the image data stored in the buffer memory 16b to the image memory 17b and also provide address data and other control signals to a memory controller 17a in the memory circuit unit 17. Thus, the image data is written in the image memory 17b under control of the memory controller 17a. It is possible to provide a function of the image memory 17b in the memory circuit unit 17 as an image memory in the information unit/terminal 3. In this case, the image data and control signals such as address data supplied from the information unit/terminal 3 are received via data bus and address bus of the connector 14.

Upon receipt of the signal, the system controller 16c controls the switch 16e, to supply the image data input from the information unit/terminal 3 via the interface controller 16f to the image memory 17b in the memory circuit unit 17. The supplied image data is written in the image memory 17b in the manner as noted above under control of the memory controller 17a. As shown, the image memory 17b in the memory circuit unit 17 can also function as the image memory of the information unit/terminal 3.

When transmitting the image data stored in the image memory 17b to the information unit/terminal 3, the system controller 16c controls the switch 16e and memory controller 17a for supplying the image data stored in the image memory 17b to the interface circuit 16f along with the address data and other control signals.

On the operating unit 12, various input switch/knobs 12a as noted above, related to imaging, are provided in addition to the trigger switch 12b for picking up image. From the input switch/knobs 12a various signals for setting conditions or the like concerning imaging are supplied to the system controller 16c. Upon receipt of these signals, the system controller 16c supplies control signals to various circuit parts to set the imaging apparatus 1 in a state according to the instructions from the switch/knobs 12a.

Figure 4:
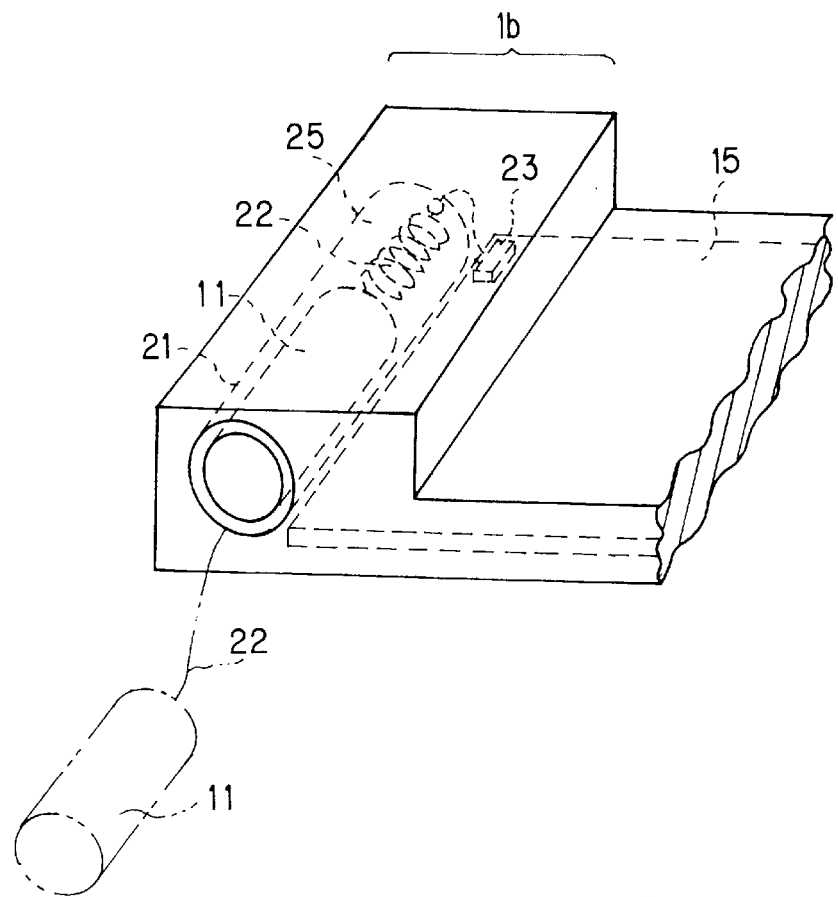
FIG. 4 is a perspective view of the camera unit 11 which is detachably accommodated in the box-like part 1b.

The camera unit 11 which is detachably accommodated in the box-like part 1b is shown in the perspective view of FIG. 4. The box-like part 1b has a bore-like camera accommodation space 21, in which the camera unit 11 is accommodated. The camera unit 11 is connected via a cable 22 and a connector 23 to the imaging circuit unit 15 in the card-like part 1a. The cable 22 may be accommodated in a cable accommodation space 25 which is continuous to the camera accommodation space 21.

Figure 6:
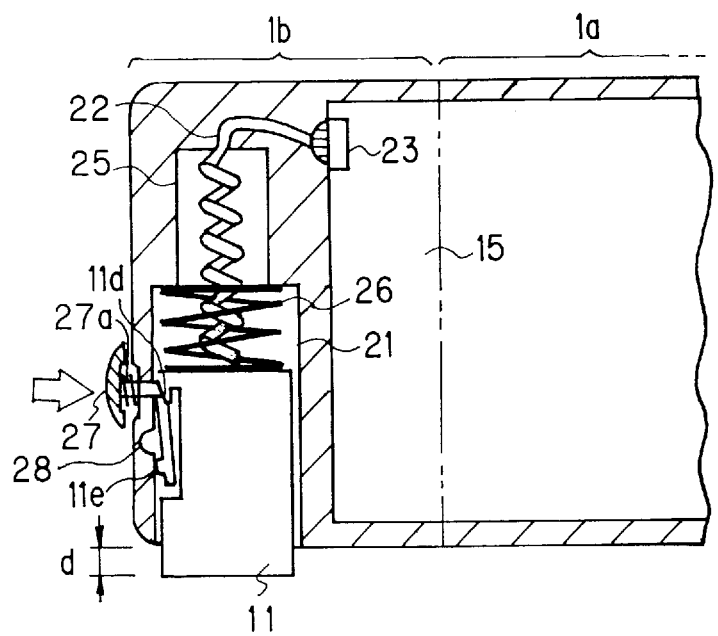
Figure 7:
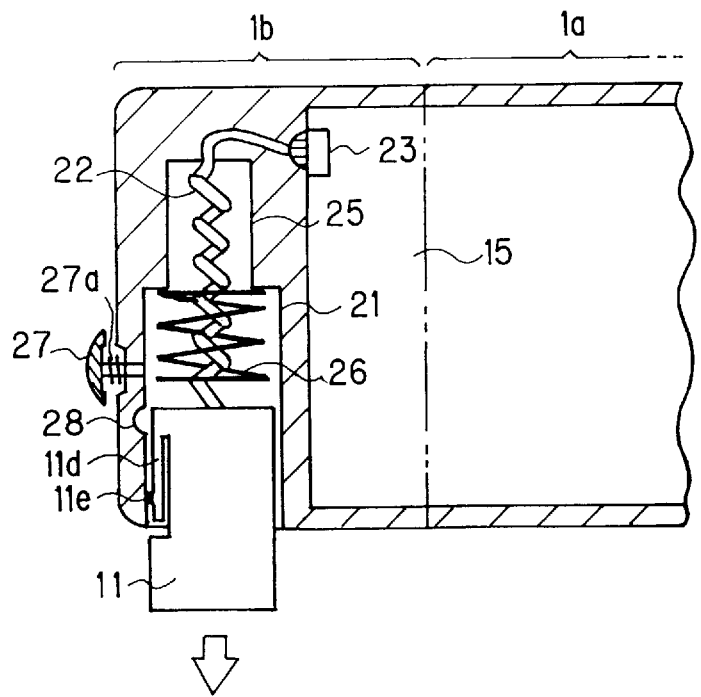

Such a structure permits imaging with the camera unit 11 hand-held. Specifically, the camera unit 11 can be taken out from the camera accommodation space 21 as shown by phantom lines in the Figure for free handling, such as directing the sole camera unit 11 toward an object. It is also possible to execute the recording by merely operating the trigger switch 11c of the camera unit FIGS. 5 to 7 are sectional views showing details of the structure, in which the camera unit 11 can be removably mounted in the box-like part 1b, as shown in FIG. 4.

Figure 5:
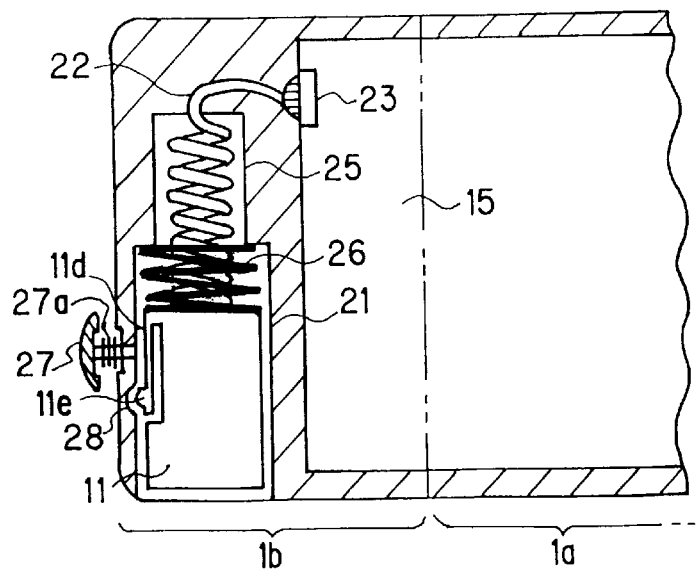
FIGS. 5 to 7 are sectional views showing details of the apparatus in which the camera unit 11 can be removably mounted in the box-like part 1b.

Referring to FIG. 5, the cable 22 connected to the camera unit 11 is in the form of a coil and has a reproducing property. The other end of the cable 22 is electrically connected via the the connector 23 to the imaging circuit unit 15. A hook 11d having elasticity is provided on the outer surface of the camera unit 11. The hook 11d has a projection 11e formed at its end. The camera unit 11 can be locked in the camera accommodation space 21 by the engagement between the projection 11e and an engagement groove 28 formed in the inner surface defining the camera accommodation space 21. A spring 26 such as a coil spring is provided in the camera accommodation space 21. The camera unit 11 is thus locked in the camera accommodation space 21 such that it is biased outward. The box-like part 1a has a lock release button 27 assembled in it and biased by a return spring 27a. An end of the lock release button 27 can be projected into the camera accommodation space 21 to push the hook 11d on the camera unit 11 in the accommodated state. When the lock release button 27 is pushed in the state shown in FIG. 5, its end pushes the hook 11d on the camera unit 11, thus causing the projection 11e to be detached from the engagement groove 28. As a result, the camera unit 11 is pushed outward by the biasing force of the spring 26 to a state as shown in FIG. 6, in which an end portion of the camera unit 11 projects to a small extent d from the opening of the box-like part 1b. By releasing the lock release button 27 in the state shown in FIG. 6, the lock release button 27 is separated from the camera unit 11 by the return spring 27a. The camera unit 11 thus further projects outward to a state as shown in FIG. 7. In this state, the projecting end portion of the camera unit 11 can be readily pulled out with a hand or the like. In this way, the camera unit 11 can be completely removed from the box-like part 1b.

Figure 8:
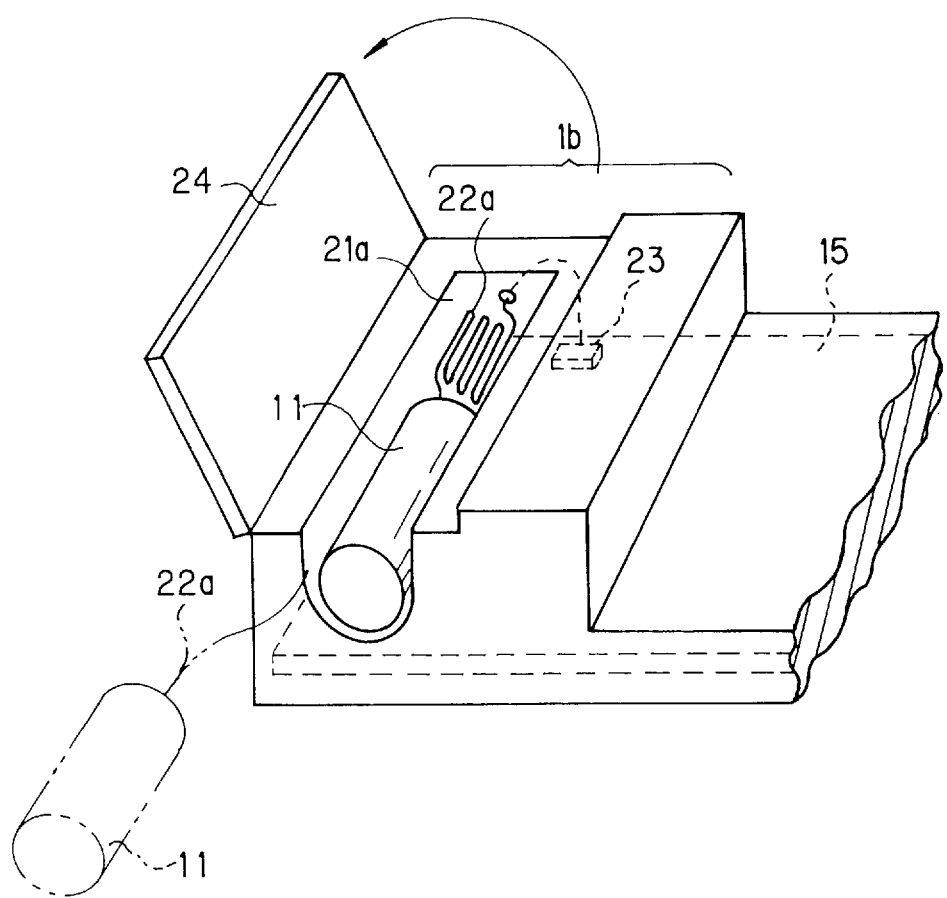
FIG. 8 is a perspective view showing camera unit 11 accommodated in the box-like part 1b.

A modification of the structure shown in FIG. 4 is shown in FIG. 8, which is a perspective view showing camera unit 11 accommodated in the box-like part 1b. The box-like part 1b has a groove-like camera accommodation space 21a, in which the camera unit 11 is accommodated together with cable 22, and a cover 24 which can open and close the camera accommodation space 21a. The cover 24 coveres the side of the camera unit 11. The camera unit 11 is opened on the side of the lens 11a, thus permitting the imaging without any trouble. By using a flexible cable having certain rigidity as the cable 22a accommodated in the camera accommodation space 21a the camera unit 11 which has been taken out of the box-part 1a, may be freely held in a posture directed toward a foreground subject without holding it by hand. Alternatively, a universal joint or like support may be mounted. With this modification, the camera unit taken out from the box-like part need not be held continuously by hand, so that the apparatus is further handy, as well as providing substantially the same effects as those of the structure shown in FIG. 4.

The box-like part shown in FIGS. 1, 4, 8 etc. is substantially rectangular in shape. Such shape, however, is by no means limitative; it is possible to adopt a cylindrical or half cylindrical shape as well. This box-like part is required to have a certain large thickness compared to the card-like part, and it may have various shapes so long as this requirement is met.

Figure 9:
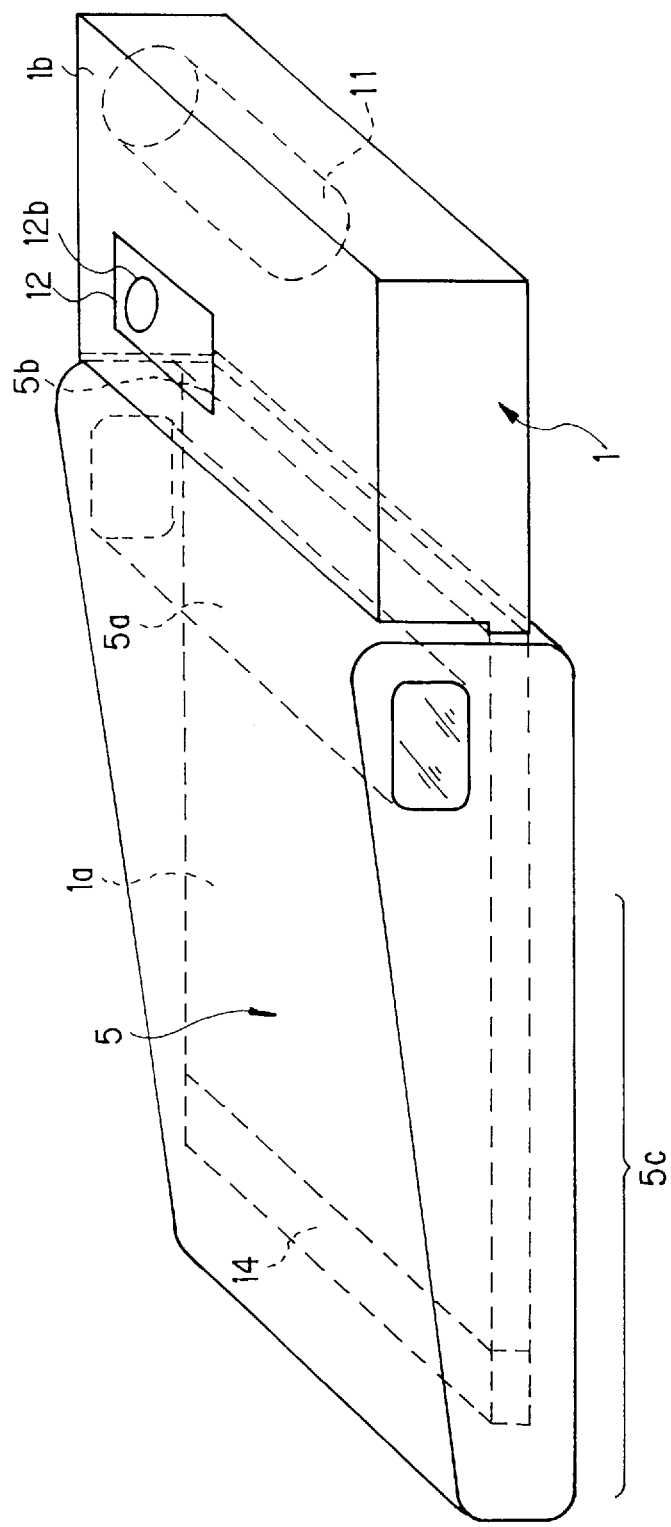
FIG. 9 is a perspective view showing the imaging apparatus together with an adapter 5 having a view-finder function and mounted therein according to the present invention.
Figure 10:
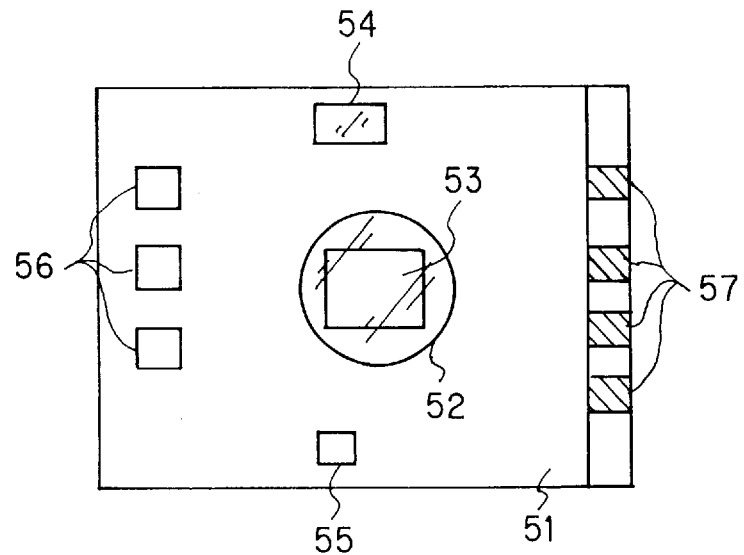
FIGS. 10 and 11 show conventional electronic cameras having a card-like camera body made of a plastic material.
Figure 11:
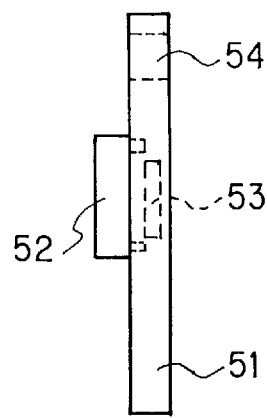

FIG. 9 is a perspective view showing the imaging apparatus together with an adapter 5 having a view-finder function and mounted therein. The adapter 5 may be mounted as shown in FIG. 9 when using the imaging apparatus 1 as electronic camera. The adapter 5 has a simplified optical view-finder 5a, a slot 5b for inserting the card-like part 1a of the imaging apparatus 1 and a grip 5c to be gripped with a hand.

By inserting the card-like part 1a of the imaging apparatus 1 through the slot 5b of the adapter 5, the connector 14 of the card-like part 1a is engaged with a locking member provided inside the slot 5b, whereby the imaging apparatus 1 is made integral with the adapter 5. The imaging apparatus 1 with the adapter 5 mounted therein, serves as an electronic camera having camera unit 11, trigger switch 12b and optical view-finder 5a, and permits imaging by gripping the grip 5a.

Further, the adapter 5 covers the connector 14, thus protecting the electric contacts. Of course, that the imaging apparatus 1 can be used without connecting the adapter 5.

According to the embodiment as described, it is possible to make imaging not only by itself, but also by connected state to the portable information unit/ terminal since its box-like part is in an operable state for imaging and, its camera unit can be taken out and freely handled and is handy. The operability is thus further satisfactory since in this case data recording can be performed by operating the trigger switch provided on the camera unit. Further, since the operating unit is provided on the box-like part, it is possible to set conditions concerning imaging or the like with the imaging apparatus connected to the information unit/ terminal, and is very useful. By mounting the adapter, an electronic camera can be constructed which permits imaging while observing the foreground subject. As shown, there is no need of providing an optical view-finder or like unit in the imaging apparatus. It is thus readily possible to realize an imaging apparatus which conforms in thickness or size to an IC card.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed:

1. An imaging apparatus comprising:
   (A) a card-like part capable of being inserted into a different unit and
   (B) a box-like part provided at one end of the card-like part and is adapted to project from the different unit when the card-like part is inserted in the different unit, the box-like part comprising:
      (b1) a camera unit as an image sensor unit including a lens, an imager disposed on the focal plane of the lens, and a first trigger switch which is to be operated when photographing;
      (b2) a power supply unit for supplying a power to various circuit parts of the apparatus; and
      (b3) an operating unit including input switch/knobs and a second trigger switch which is to be operated when imaging and is provided on the box-like part, and
   the card-like part comprising:
      (a1) an imaging circuit unit for driving the imager and A/D converting the image output therefrom to produce a digital signal;
      (a2) a digital processing circuit unit for processing the digital signal to produce a processed signal; and
      (a3) a connector provided at an end of the card-like part and including a terminal for sending out the processed signal to the outside, wherein the box-like part further comprises:
         (b4) a bore-like camera accommodation space for accommodating the camera unit, a cable through which the camera unit is connected to the imaging circuit unit in the card-like part, and capable of being accommodated in a cable accommodation space contiguous to the camera accommodation space.

2. An imaging apparatus according to claim 1, wherein the cable connected to the camera unit is in the form of a coil having a reproducing property and the other end of the cable is electrically connected via the the connector to the imaging circuit unit.

3. An imaging apparatus according to claim 2, further comprising:
   an elastic hook provided on the outer surface of the camera unit and having a projection formed at its end;
   an engagement groove formed in the inner surface defining the camera accommodation space for locking the camera unit in the camera accommodation space by the engagement with the projection;
   spring provided in the camera accommodation space so that the camera unit is locked in the camera accommodation space such that it is biased outward;
   a lock release button formed in the box-like part and biased by a return spring, an end of the lock release button capable of being projected into the camera accommodation space to push the hook on the camera unit in the accommodated state.

4. An imaging apparatus comprising:
   (A) a card-like part capable of being inserted into a different unit and
   (B) a box-like part provided at one end of the card-like part and is adapted to project from the different unit when the card-like part is inserted in the different unit; and
   (C) an adapter having a view-finder function, the box-like part comprising:
      (b1) a camera unit as an image sensor unit including a lens, an imager disposed on the focal plane of the lens, and a first trigger switch which is to be operated when photographing;
      (b2) a power supply unit for supplying a power to various circuit parts of the apparatus; and
      (b3) an operating unit including input switch/knobs and a second trigger switch which is to be operated when imaging and is provided on the box-like part, and
   the card-like part comprising:
      (a1) an imaging circuit unit for driving the imager and A/D converting the image output therefrom to produce a digital signal;
      (a2) a digital processing circuit unit for processing the digital signal to produce a processed signal; and
      (a3) a connector provided at an end of the card-like part and including a terminal for sending out the processed signal to the outside,
   wherein a card slot is provided in the different unit and electrically connected thereto via the connector; and a display means is provided on the top of the different unit, and further,
   wherein the adapter includes an optical view-finder, a slot for inserting the card-like part and a hand grip.

5. An imaging apparatus according to claim 4, wherein the card-like part of the imaging apparatus is inserted through the slot of the adaptor, and the connector of the card-like part is engaged with a locking member provided inside the slot.

6. An imaging apparatus comprising:
   (A) a card-like part capable of being inserted into a different unit, and
   (B) a box-like part provided at one end of the card-like part and adapted to project from the different unit when the card-like part is inserted in the different unit, the box-like part comprising:
      (b1) a camera unit as an image sensor unit including a lens, an imager disposed on the focal plane of the lens, and a first trigger switch which is to be operated when photographing;
      (b2) a power supply unit for supplying a power to various circuit parts of the apparatus; and (b3) an operating unit including input switch/knobs and a second trigger switch which is to be operated when imaging and is provided on the box-like part, and the card-like part comprising:

(a1) an imaging circuit unit for driving the imager and A/D converting the image output therefrom to produce a digital signal;

(a2) a digital processing circuit unit for processing the digital signal to produce a processed signal; and (a3) a connector provided at an end of the card-like part and including a terminal for sending out the processed signal to the outside, wherein a card slot is provided in the different unit and electrically connected thereto via the connector, wherein a display means is provided on the top of the different unit, and wherein the box-like part includes a groove-like camera accommodation space for accommodating the camera unit together with a cable, and a cover which can open and close the camera accommodation space and covering the side of the camera unit to open the side of the lens of the camera unit.

* * * * *